(12) United States Patent
Bloom et al.

(10) Patent No.: US 8,730,557 B2
(45) Date of Patent: May 20, 2014

(54) LOW VOLTAGE DRIVE FOR MEMS RIBBON ARRAY LIGHT MODULATORS

(71) Applicants: David M Bloom, Jackson, WY (US); Matthew A Leone, Jackson, WY (US)

(72) Inventors: David M Bloom, Jackson, WY (US); Matthew A Leone, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 12 days.

(21) Appl. No.: 13/657,530

(22) Filed: Oct. 22, 2012

(65) Prior Publication Data

US 2013/0100520 A1    Apr. 25, 2013

Related U.S. Application Data

(60) Provisional application No. 61/550,810, filed on Oct. 24, 2011.

(51) Int. Cl.
*G02B 26/00* (2006.01)
*G02B 26/08* (2006.01)
*G02F 1/29* (2006.01)

(52) U.S. Cl.
USPC ............................ 359/290; 359/292; 359/298

(58) Field of Classification Search
USPC .......... 359/237, 290–292, 295, 298; 345/204, 345/205, 206, 207, 208, 209, 210, 211, 212, 345/213, 214, 215, 51, 98
See application file for complete search history.

(56) References Cited

U.S. PATENT DOCUMENTS

| | | | |
|---|---|---|---|
| 7,054,051 B1 | 5/2006 | Bloom | |
| 7,277,216 B2 | 10/2007 | Bloom | |
| 7,286,277 B2 | 10/2007 | Bloom et al. | |
| 7,940,448 B2 | 5/2011 | Bloom et al. | |
| 2004/0036950 A1* | 2/2004 | Hunter et al. | 359/295 |
| 2012/0099171 A1 | 4/2012 | Yeh et al. | |

* cited by examiner

*Primary Examiner* — Thomas K Pham
*Assistant Examiner* — Brandi Thomas
(74) *Attorney, Agent, or Firm* — NUPAT, LLC; Morrison Ulman (57) ABSTRACT

A series bias voltage increases the sensitivity of a MEMS ribbon to control signal voltages. This effect is obtained because of the nonlinear dependence of ribbon deflection on applied voltage. The resulting low-voltage operation of MEMS ribbons makes them more compatible with high speed electronics.

8 Claims, 13 Drawing Sheets

LOW VOLTAGE DRIVE FOR MEMS RIBBON ARRAY LIGHT MODULATORS

TECHNICAL FIELD

The disclosure is related to electronic drive systems for light modulators based on micro-electromechanical systems (MEMS) ribbon arrays.

BACKGROUND

MEMS ribbon arrays have proved useful in many different types of high speed light modulator. Some examples of different kinds of light modulators based on MEMS ribbon arrays are described in U.S. Pat. Nos. 7,054,051, 7,277,216, 7,286,277, and 7,940,448.

Figure 1A:
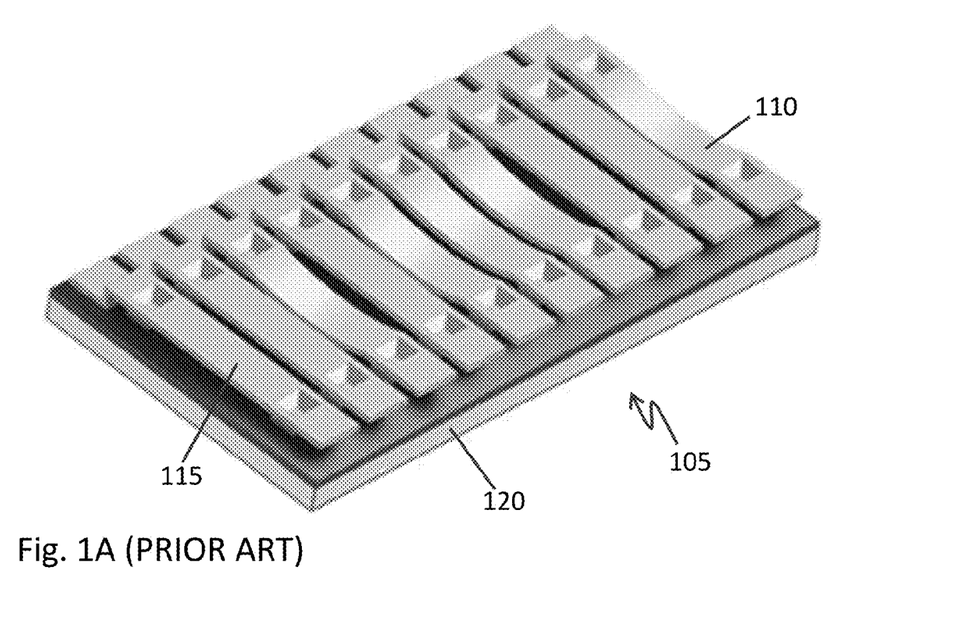
FIG. 1A is a conceptual drawing of a MEMS ribbon array.

FIG. 1A is a conceptual drawing of a MEMS ribbon array 105. Ribbons, e.g. 110, 115, are mounted above a substrate 120. Application of a voltage between a ribbon and the substrate causes the ribbon to deflect toward the substrate; ribbon 110 is deflected, for example, while ribbon 115 is relaxed. Typical dimensions for a MEMS ribbon in an array are tens to hundreds of microns long, a few microns wide, and a fraction of a micron thick. Ribbons may be made from silicon nitride and coated with aluminum.

MEMS ribbons can switch between relaxed and deflected states in as little as about ten nanoseconds. The corresponding high pixel switching speed means that a linear array of MEMS ribbons can do the job of a two-dimensional light modulator. A line image produced by a linear array modulator may be swept from side to side to paint a two dimensional scene.

High-speed ribbons require high-speed electrical signals to drive them. Ribbons in a typical MEMS array need 10 to 15 volts potential difference from the substrate to deflect by a quarter optical wavelength. Switching 10 to 15 volts at hundreds of megahertz is a specialized task often requiring custom made electronic driver circuits. It would be more convenient if MEMS ribbon arrays could be driven by conventional high-speed digital electronic circuits. Tighter integration between MEMS and CMOS circuits, for example, could lead to a MEMS linear array being considered as an optical output stage for an integrated circuit.

DETAILED DESCRIPTION

Figure 1B:
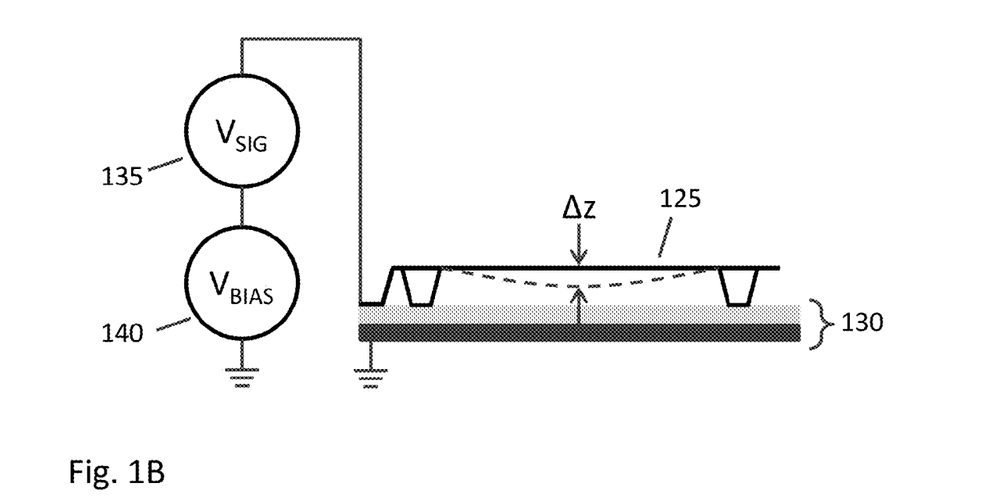
FIG. 1B is a simplified diagram showing a signal voltage supply and a bias voltage supply connected to a MEMS ribbon.

Low-voltage drive systems for MEMS ribbon-array light modulators are based on a DC bias voltage and a low-voltage ribbon control signal added in series to take advantage of ribbon nonlinear displacement characteristics. FIG. 1B provides a simplified diagram of this arrangement. In FIG. 1B, MEMS ribbon 125 is suspended above substrate 130. Control signal voltage $V_{SIG}$ 135 and bias voltage $V_{BIAS}$ 140 are connected in series to apply a combined voltage between the ribbon and the substrate. A potential difference between ribbon and substrate causes the ribbon to deflect toward the substrate by an amount $\Delta z$ as indicated by the dashed curve.

FIG. 1B shows only one ribbon connected to the signal and bias voltage sources. In a typical MEMS ribbon array light modulator, all ribbons are connected to a bias voltage source. A subset of the ribbons, often every second ribbon in an array for example, is connected to a signal voltage source in series with the bias voltage source. Ribbons in this subset may be called "active" ribbons while those that are connected to the bias voltage, but not the signal voltage may be called "static" ribbons. The active ribbons deflect independently of one another. This happens because the signal voltage applied to each active ribbon may be the same as or different from that applied to any other. In effect, each active ribbon has its own signal voltage source. In practice, one signal voltage source may drive multiple ribbons via multiplexing techniques. Hence the term "signal voltage source" means one that can supply different signal voltages to different ribbons.

Figure 1C:
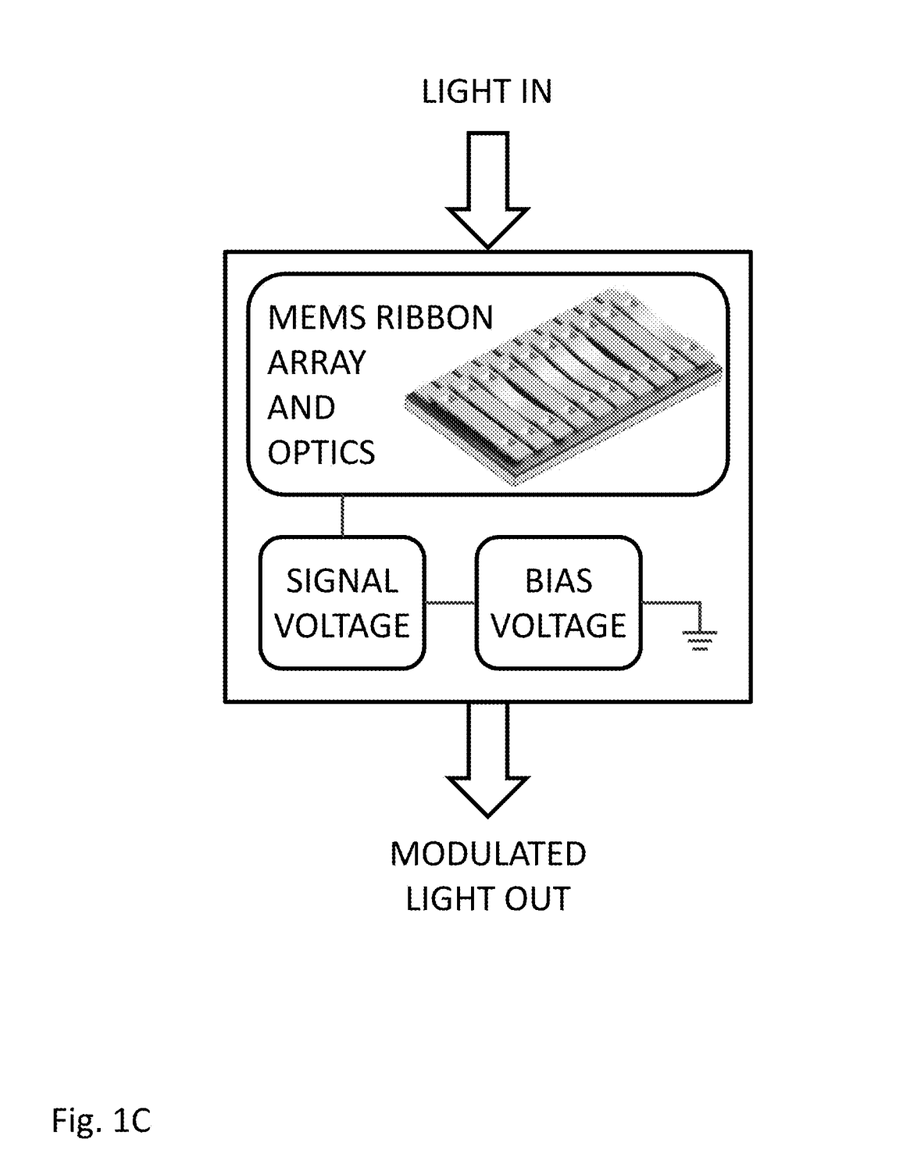
FIG. 1C is a conceptual block diagram of a MEMS light modulator including a MEMS ribbon array and associated optics, a control signal voltage supply, and a bias voltage supply.

FIG. 1C is a conceptual block diagram of a MEMS light modulator including a MEMS ribbon array and associated optics, a control signal voltage supply, and a bias voltage supply. Optical details such as focusing lenses, phase discriminators, beam splitters, scan mirrors, and so on, are omitted in the figure for clarity. The modulator includes a MEMS ribbon array driven by a bias voltage and a control signal voltage in series. Modulators like that of FIG. 1C may be used in projection displays, microdisplays, printers and 3D depth-capture systems among other applications.

Figure 2:
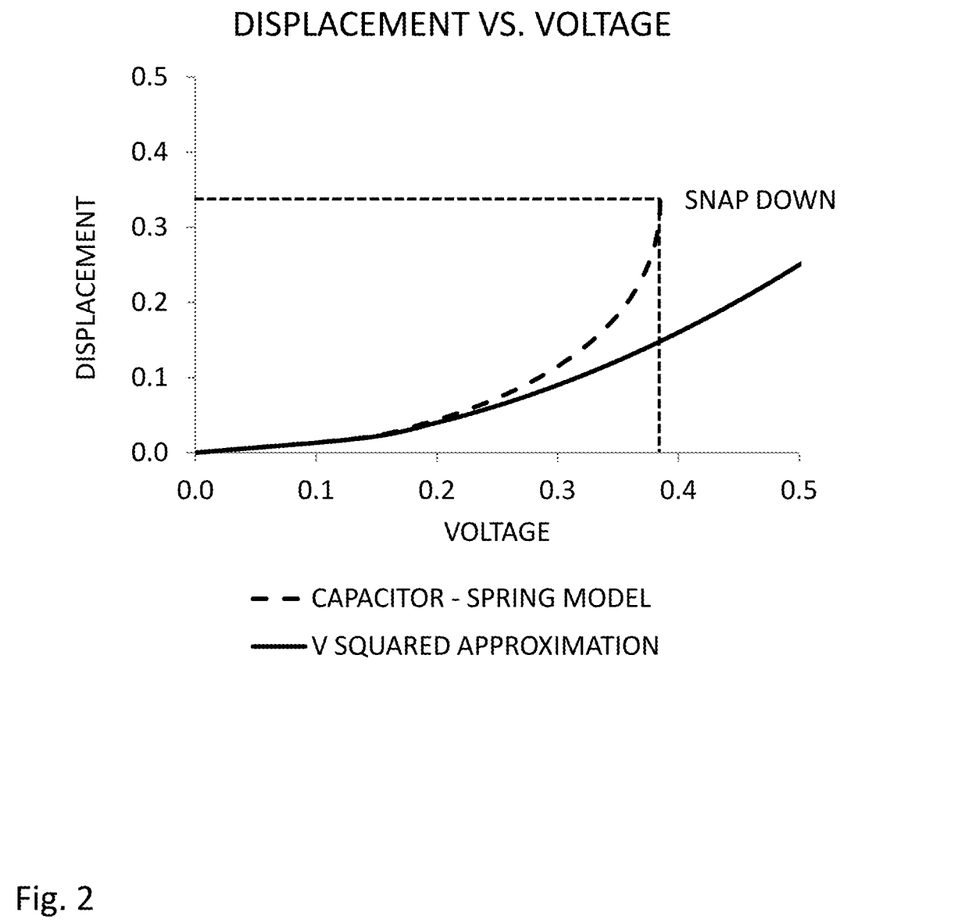
FIG. 2 illustrates displacement versus voltage behavior for a MEMS ribbon such as that shown in FIG. 1B.

A closer look at MEMS ribbon behavior helps explain how the series connected bias and control signal voltage supplies of FIGS. 1B and 1C lead to low-voltage operation of MEMS ribbon arrays. In particular, FIG. 2 illustrates displacement (i.e. $\Delta z$) versus voltage behavior for a MEMS ribbon such as that shown in FIG. 1B. In FIG. 2, displacement is normalized to the distance between ribbon and substrate in a relaxed state with no applied voltage. In other words, when the displacement is equal to one, the ribbon touches the substrate. The units of voltage are arbitrary.

The dashed line plots ribbon displacement as calculated according to a model in which a ribbon is treated electrically as a capacitor and mechanically as a spring. When the ribbon displacement reaches ⅓ the system becomes unstable and the ribbon snaps down to the substrate. Said another way, the slope of the displacement versus voltage curve becomes infinite at that point. To avoid snap down, most MEMS ribbon array devices are operated at voltages less than the snap down voltage.

The solid line plots an approximation to the actual ribbon displacement curve. In this approximation, displacement is proportional to voltage squared. It is apparent that the $V^2$ approximation underestimates the actual displacement; however, it is reasonably accurate away from the snap down voltage.

Figure 3:
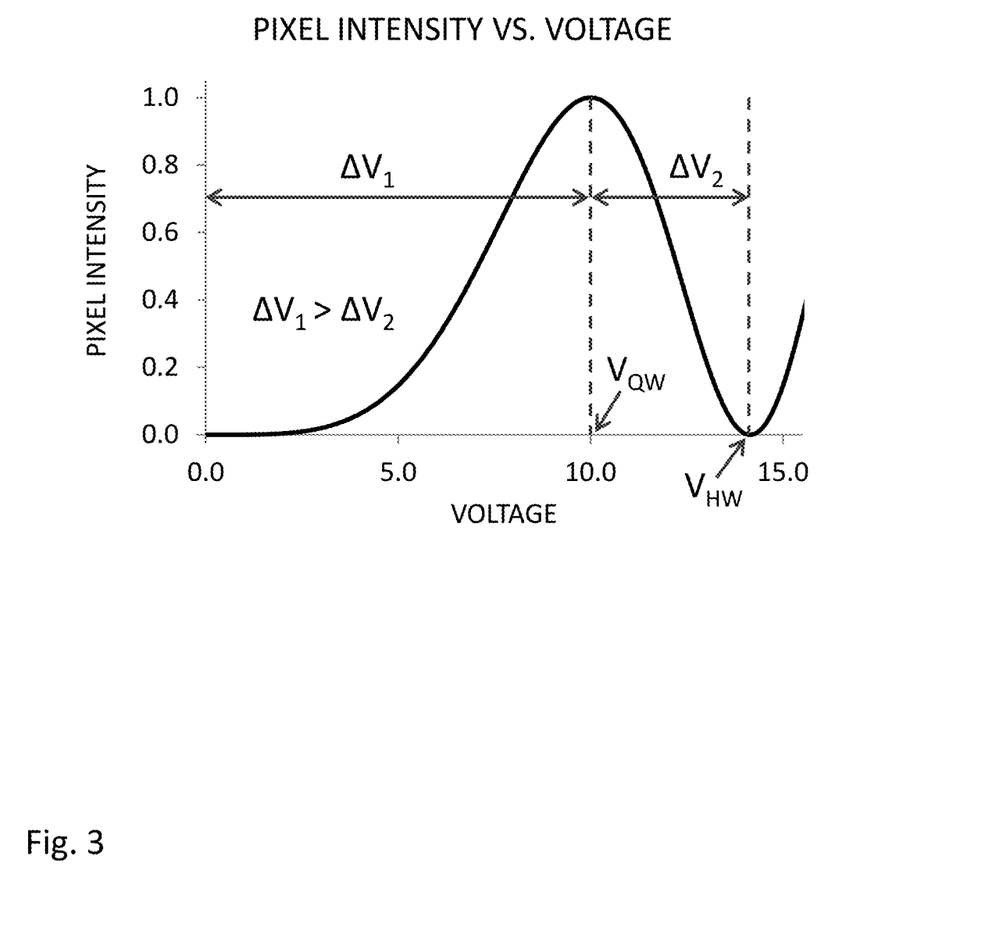
FIG. 3 is a graph of pixel intensity versus voltage for a MEMS light modulator.

Both the capacitor-spring model and the $V^2$ approximation to it exhibit nonlinear behavior: the additional voltage required to deflect a ribbon one unit decreases as voltage increases. FIG. 3 illustrates the implications of this behavior for an optical modulator based on a MEMS ribbon array. FIG. 3 is a graph of pixel intensity versus voltage where pixel intensity is proportional to the sine squared of ribbon displacement, as is the case for many types of MEMS ribbon light modulators. Pixel intensity is normalized to its maximum value while the voltage scale is typical of a MEMS ribbon array device. In FIG. 3, the voltage $\Delta V_1$ required to deflect a ribbon a quarter optical wavelength ($\lambda/4$) is 10 V. This leads to pixel intensity $$I \propto \sin^2\left(\left(\frac{2\pi}{\lambda}\right)\left(\frac{\lambda}{4}\right)\right) = 1.$$

The additional voltage $\Delta V_2$ required to deflect the ribbon from $\lambda/4$ to $\lambda/2$ displacement, where I=0 is only about 4 V.

Figure 4A:
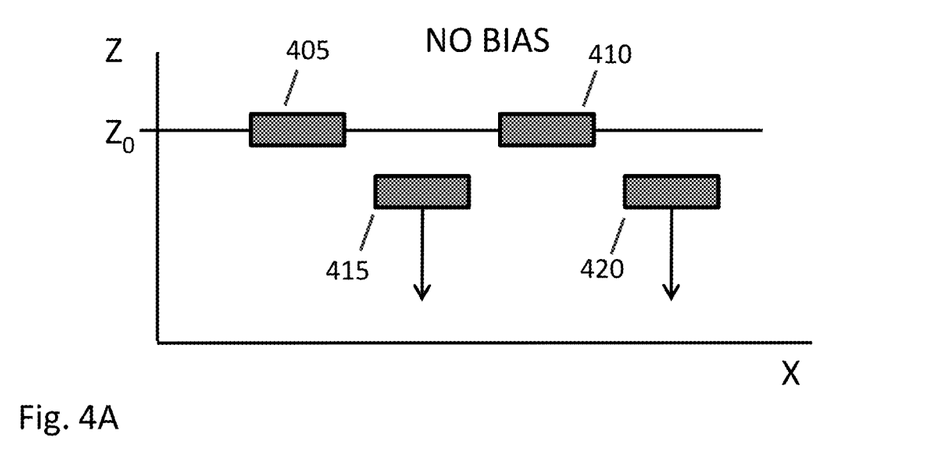
FIG. 4A is a conceptual diagram of ribbon displacements in an unbiased MEMS ribbon array.

The utility of the nonlinear dependence of pixel intensity on voltage is now described in further detail. To set a baseline for comparison, first consider ribbon behavior with zero bias voltage. FIG. 4A is a conceptual diagram of ribbon displacements in an unbiased MEMS ribbon array. In FIG. 4A, ribbons 405 and 410 (viewed in cross section) are stationary at a height $Z_0$ above a substrate. Ribbons 415 and 420 (also viewed in cross section) deflect toward a substrate under the influence of an applied voltage.

Figure 4B:
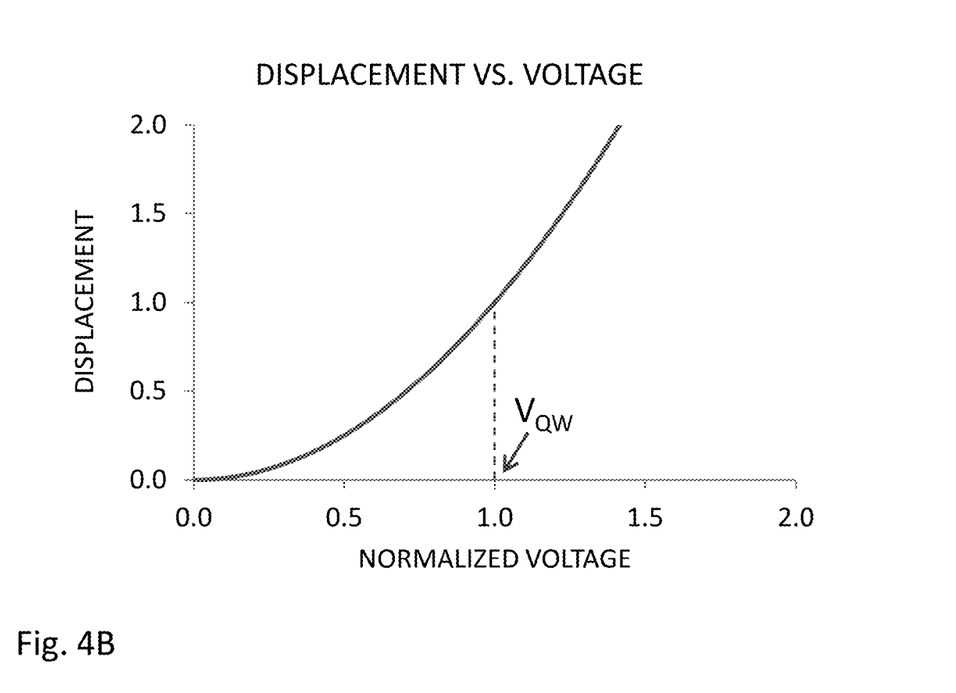
FIGS. 4B-4D are graphs of displacement versus voltage, pixel intensity versus displacement, and pixel intensity versus voltage, respectively, for an unbiased MEMS-ribbon-array-based light modulator.
Figure 4C:
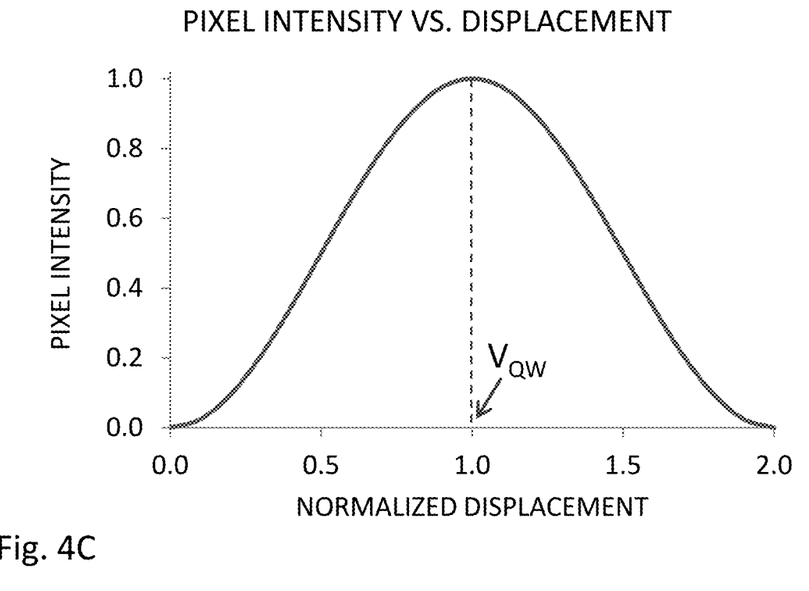
Figure 4D:
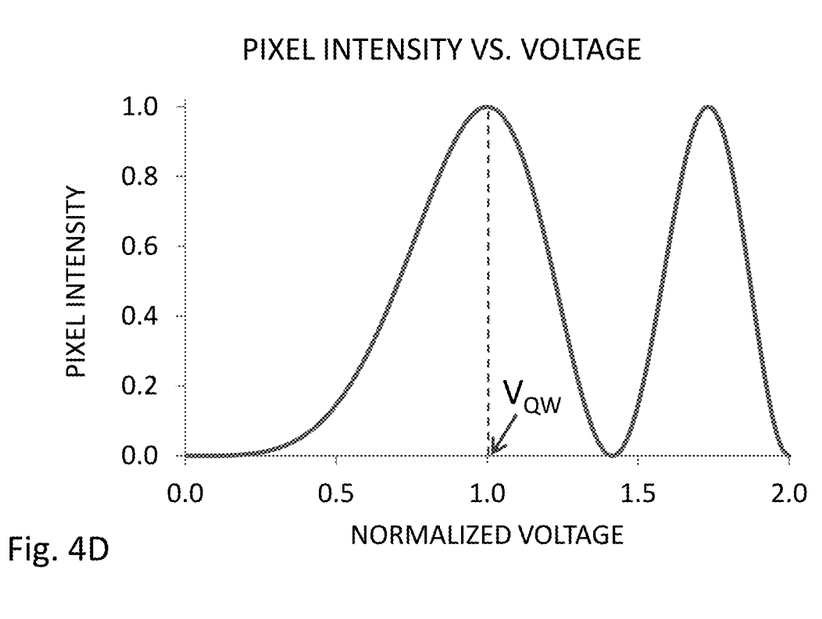

FIGS. 4B-4D are graphs of displacement versus voltage, pixel intensity versus displacement, and pixel intensity versus voltage, respectively, for an unbiased MEMS-ribbon-array-based light modulator. FIG. 4B is a graph of ribbon displacement versus voltage using the approximation that displacement is proportional to voltage squared. FIG. 4C is a graph of pixel intensity versus displacement where pixel intensity is proportional to the sine squared of the displacement. Finally, FIG. 4D is a graph of pixel intensity versus voltage where pixel intensity is proportional to the sine squared of the voltage squared.

The graphs of FIGS. 4B-4D are normalized such that a unit voltage leads to a unit displacement, and a unit displacement leads to unit pixel intensity. The unit voltage, and the displacement which it produces, are labeled "$V_{QW}$" since a $(Z-Z_0)=\lambda/4$ ("quarter wave") ribbon displacement leads to maximum pixel intensity in a typical ribbon-based light modulator. FIGS. 4A, 4B and 4D may now be compared with FIGS. 5A, 5B and 5C which illustrate the effects of biasing.

Figure 5A:
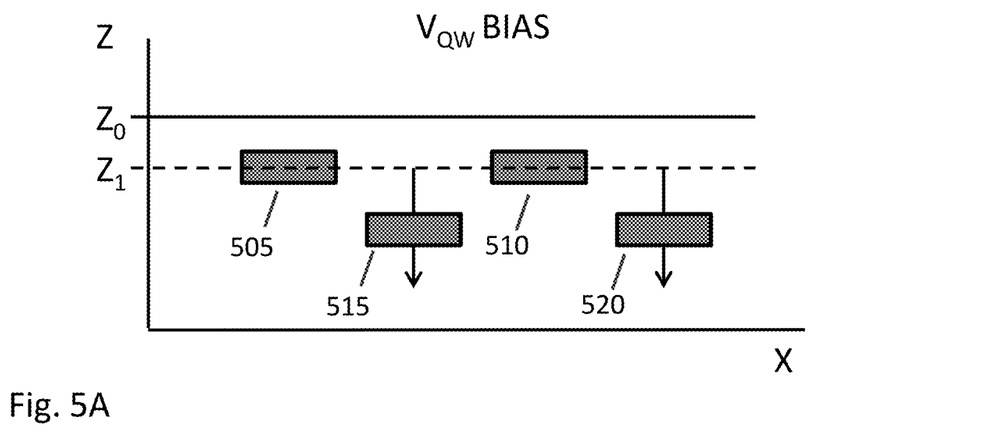
FIG. 5A is a conceptual diagram of ribbon displacements in a biased MEMS ribbon array.

FIG. 5A is a conceptual diagram of ribbon displacements in a biased MEMS ribbon array. In FIG. 5A, ribbons 505 and 510 (viewed in cross section) are under the influence of a DC bias voltage that deflects them from height $Z_0$ to height $Z_1$ above a substrate. Ribbons 415 and 420 (also viewed in cross section) are biased by the same voltage and they deflect from height $Z_1$ further toward a substrate under the influence of an additional signal voltage.

Figure 5B:
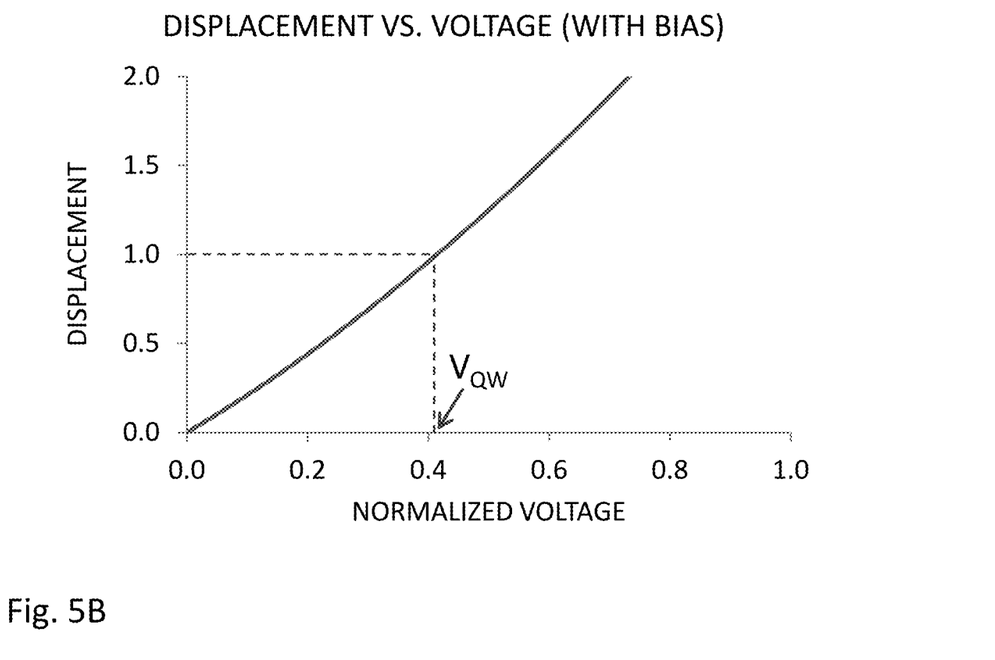
FIGS. 5B-5C are graphs of displacement versus voltage and pixel intensity versus voltage, respectively, for a biased MEMS-ribbon-array-based light modulator.

FIG. 5B is a graph of displacement versus voltage for ribbons 515 and 520. In FIG. 5B the displacement scale represents additional displacement starting from biased height $Z_1$ and the voltage scale represents signal voltage added to the DC bias voltage. The displacement scale is normalized such that unit displacement corresponds to a ribbon movement of $\lambda/4$. The voltage scale is normalized such that unit voltage in FIG. 5B has the same magnitude as unit voltage in FIG. 4B.

Figure 5C:
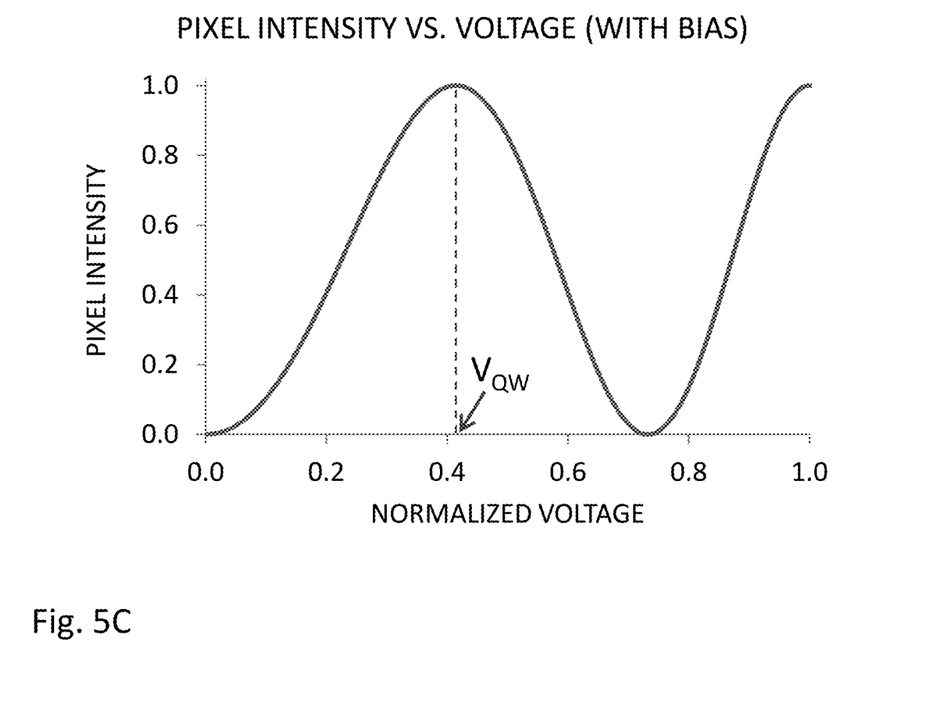

The DC bias voltage that deflects ribbons to height $Z_1$ in FIG. 5A and influences the results presented in FIGS. 5B and 5C has unit magnitude on the scale of the graphs of FIGS. 4B, 4D, 5B and 5C. In this example the bias voltage is $V_{QW}$; i.e. $(Z_1-Z_0)=\lambda/4$. FIG. 5B shows that the magnitude of the signal voltage (added in series to the bias voltage) required to obtain an additional $\lambda/4$ ribbon displacement is about 0.41. This is 59% less than the voltage required to obtain the first $\lambda/4$ ribbon displacement from $Z_0$ to $Z_1$.

FIG. 5C is a graph of pixel intensity versus voltage where pixel intensity is proportional to the sine squared of the voltage squared. The pixel intensity scale is normalized such that unit pixel intensity is the maximum. The voltage scale represents signal voltage added to the DC bias voltage and is normalized in the same way as in FIG. 5B. FIG. 5C shows that the magnitude of the signal voltage (added in series to the bias voltage) required to obtain maximum pixel intensity is about 0.41. This is 59% less than the voltage required to obtain maximum pixel intensity with unbiased ribbons such as those of FIG. 4A.

The bias voltage chosen for the example of FIGS. 5A-5C is just one possibility. Lower bias voltage leads to less dramatic reduction in additional signal voltage necessary to deflect a ribbon by a specified amount. Greater bias voltage leads to even greater ribbon deflection sensitivity to additional signal voltage. If the bias voltage is too great, however, snap down may occur.

The nonlinear characteristics of ribbon displacement versus applied voltage allow a light modulator designer to pick a bias voltage such that a suitable range of control signal voltage leads to full light modulation from dark to bright. An intuitive, although not complete, explanation for the origin of these nonlinear characteristics may be obtained by noting that the force on charged object, such as a MEMS ribbon, is given by F=qE where q is electric charge and E is electric field. The charge q stored on a ribbon is given by q=CV where C is the capacitance of the ribbon-substrate system and V is the voltage between them. The electric field E is given by V/d where V is the voltage between ribbon and substrate and d is the separation between them. Thus force F depends on V twice; i.e. it depends on $V^2$. Loosely speaking, the effect of a bias voltage may be thought of as storing charge on a ribbon and supplying one factor of V. A signal voltage then supplies the additional factor of V. This means that when a bias voltage is present, ribbon displacement responds to an added signal voltage approximately linearly.

Figure 6:
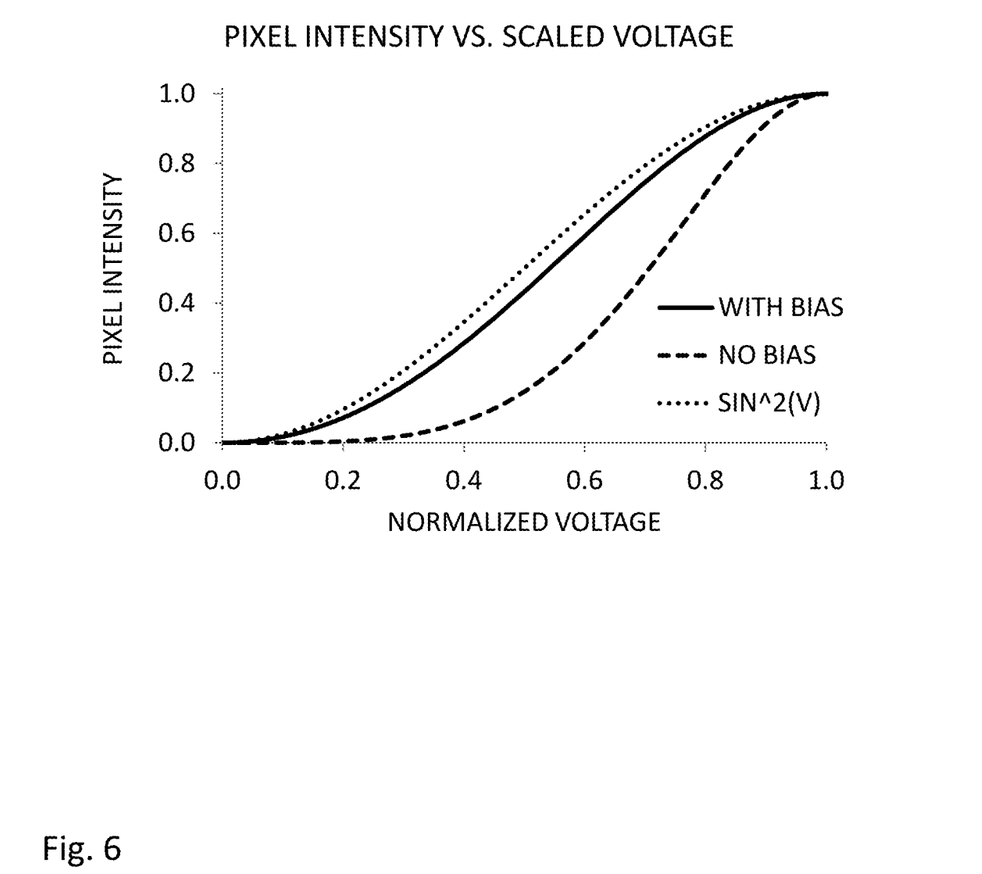
FIG. 6 is a graph of pixel intensity versus voltage for biased and unbiased MEMS-ribbon-array-based light modulators scaled such that the voltage required to obtain maximum pixel intensity is normalized to one in each case.

If ribbon displacement were actually a linear function of V, then pixel intensity would be proportional to $\sin^2(V)$ rather than $\sin^2(V^2)$. Ribbon behavior that approaches this extreme is illustrated in FIG. 6. FIG. 6 is a graph of pixel intensity versus voltage for biased and unbiased MEMS-ribbon-array-based light modulators scaled such that the voltage required to obtain maximum pixel intensity is normalized to one in each case. In other words, FIG. 6 shows the curves of FIG. 4D (dashed) and FIG. 5C (solid) on the same graph, but the voltages of FIG. 5C have been scaled such that the additional signal voltage needed to reach maximum pixel intensity is a unit voltage instead of roughly 0.41. The rescaling illustrates the functional form of the intensity versus voltage curve over the full range from dark to bright.

The dotted curve in FIG. 6 is the pixel intensity function $\sin^2(V)$ that would be obtained in an optical modulator if ribbon displacement were a linear function of V. In can be seen in FIG. 6 that when ribbons are biased, their response to control signal voltages more closely approximates this linear case. When a digital to analog converter (DAC) is used to generate ribbon control signals, a pixel intensity function like the dotted ($\sin^2(V)$) or solid (biased) curves in FIG. 6 is preferred over the dashed (no bias) curve because the full range of pixel intensities is distributed more evenly across the DAC's set of accessible discrete output voltages.

It was pointed out in "Pseudo Bipolar MEMS Ribbon Drive" (U.S. Ser. No. 12/910,072 by Yeh and Bloom, filed Oct. 22, 2010) that potentially deleterious ribbon charging effects can be avoided, even using a unipolar power supply, by changing the direction of the electric field between ribbon and substrate periodically. Often the change is made during alternate frames of video information supplied to a MEMS light modulator. The methods disclosed in that application rely on the property that the force experienced by a ribbon under voltage V is the same as the force experienced under voltage −V. (Note that the term "bias ribbon" used in U.S. Ser. No. 12/910,072 refers to a different concept than, and should not be confused with, bias voltages or biased ribbons discussed herein.)

Figure 7A:
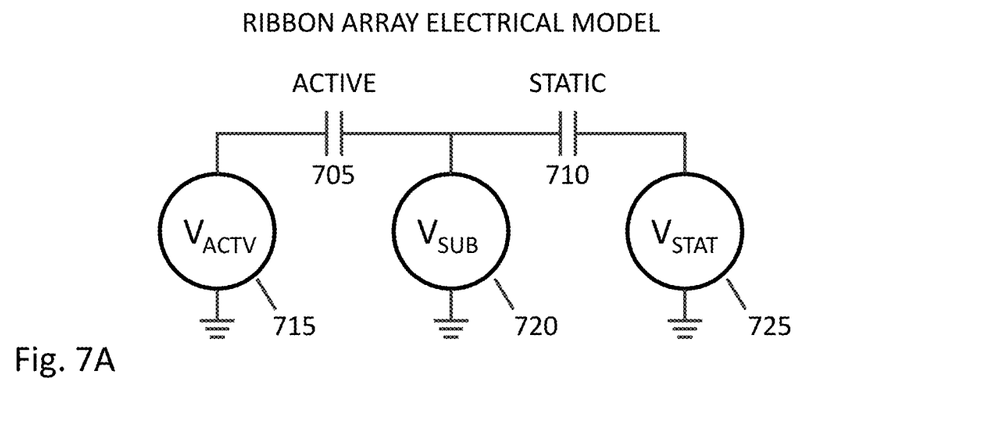
FIG. 7A is a simplified schematic diagram for a ribbon drive scheme.

FIG. 7A is a simplified schematic diagram for a ribbon drive scheme. In FIG. 7A capacitor 705 represents the electrical properties of active ribbons in a MEMS ribbon array while capacitor 710 represents the electrical properties of static ribbons in the array. Active ribbons are those that change deflection to create different pixel intensities while static ribbons do not. Voltage sources 715 and 725 are connected to active and static ribbons, respectively. Voltage source 720 is connected to the ribbons' common substrate. Voltages produced by sources 715, 720 and 725 are $V_{ACTV}$ (active ribbons), $V_{SUB}$ (substrate) and $V_{STAT}$ (static ribbons), respectively. These voltage sources may include series-connected bias and signal voltages when voltage biasing is used as described below.

Figure 7B:
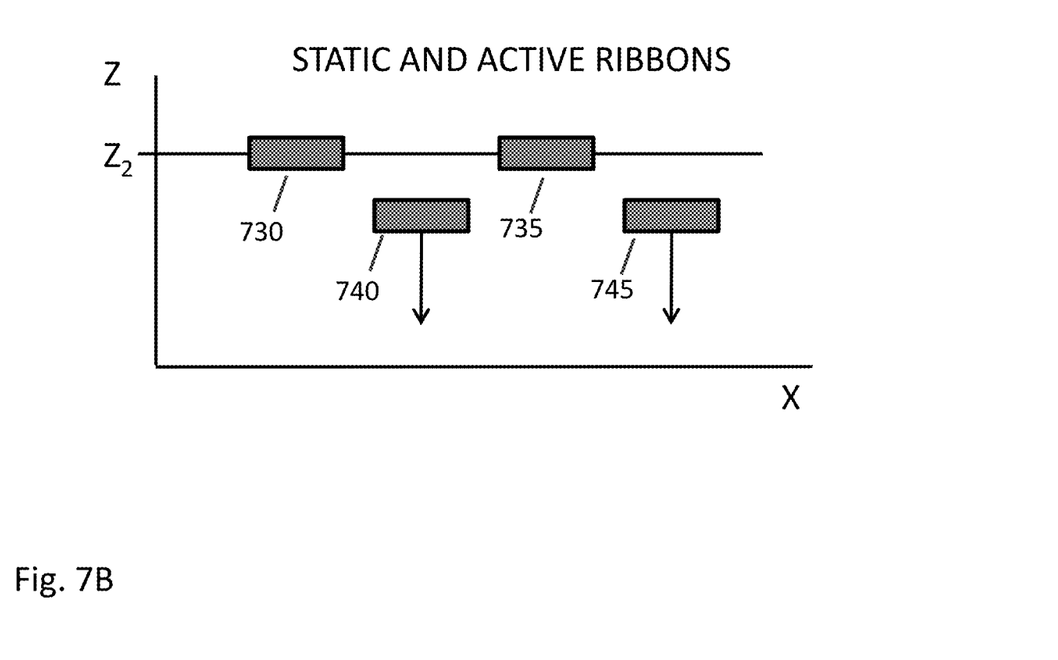
FIG. 7B is a conceptual diagram of ribbon displacements in a MEMS ribbon array.

In analogy to FIGS. 4A and 5A, FIG. 7B is a conceptual diagram of ribbon displacements in a MEMS ribbon array. Static ribbons remain at displacement $Z_2$ while active ribbons' displacement changes depending on voltages applied to them. Displacement $Z_2$ is not necessarily a ribbon's relaxed state.

Figure 8:
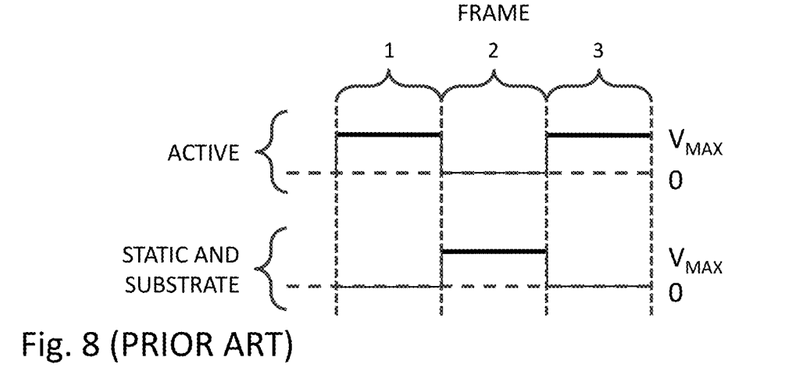
FIG. 8 is a timing diagram for sequential frames in a conventional pseudobipolar ribbon drive scheme.

FIG. 8 is a timing diagram for sequential frames in a pseudobipolar ribbon drive scheme that does not take advantage of ribbon biasing techniques to achieve low-voltage operation. (See Yeh and Bloom for more detailed discussion.) In the timing diagram, frames 1, 2 and 3 represent times during which a ribbon array is configured for a set of line images. During frames 1 and 3, static ribbons and the substrate remain at ground while active ribbons are controlled by voltages up to $V_{MAX}$ which is the voltage required for maximum pixel intensity. As mentioned above, this voltage may be as much as about 15 V for a typical MEMS ribbon array. During frame 2, active ribbons remain at ground while static ribbons and substrate vary between 0 and $V_{MAX}$. The E field switches direction from frame to frame and prevents charge build up, but without biasing, control voltages are still in 10-15 V range.

Figure 9:
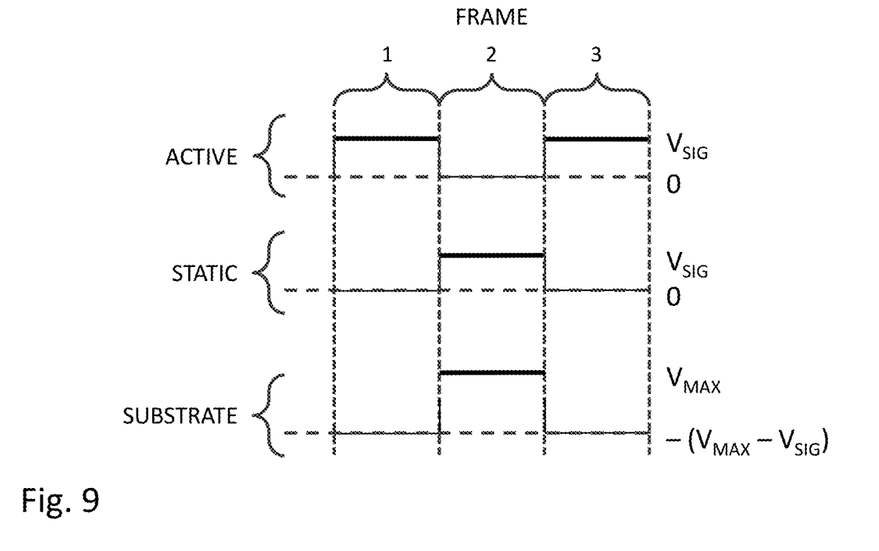
FIG. 9 is a timing diagram for sequential frames in a pseudobipolar ribbon drive scheme using a bias voltage and a signal voltage.

FIG. 9 is a timing diagram for sequential frames in a pseudobipolar ribbon drive scheme using a bias voltage and a signal voltage. Here active ribbons vary between 0 and $V_{SIG}$ and static ribbons remain at $V_{SIG}$ or 0 during each frame. The substrate varies over a range from $-(V_{MAX}-V_{SIG})$ to $V_{MAX}$ from frame to frame. In practice $V_{SIG}$ may be about 5 V or less while $V_{MAX}$ may be about 10 to 15 V. Biasing the substrate reduces the magnitude of control voltages required to deflect active ribbons. Although control voltages change with each column of video data, bias voltages only change from frame to frame. Thus the bias voltage is considered "DC" compared to the signal voltages which may change thousands of times more rapidly.

Figure 10:
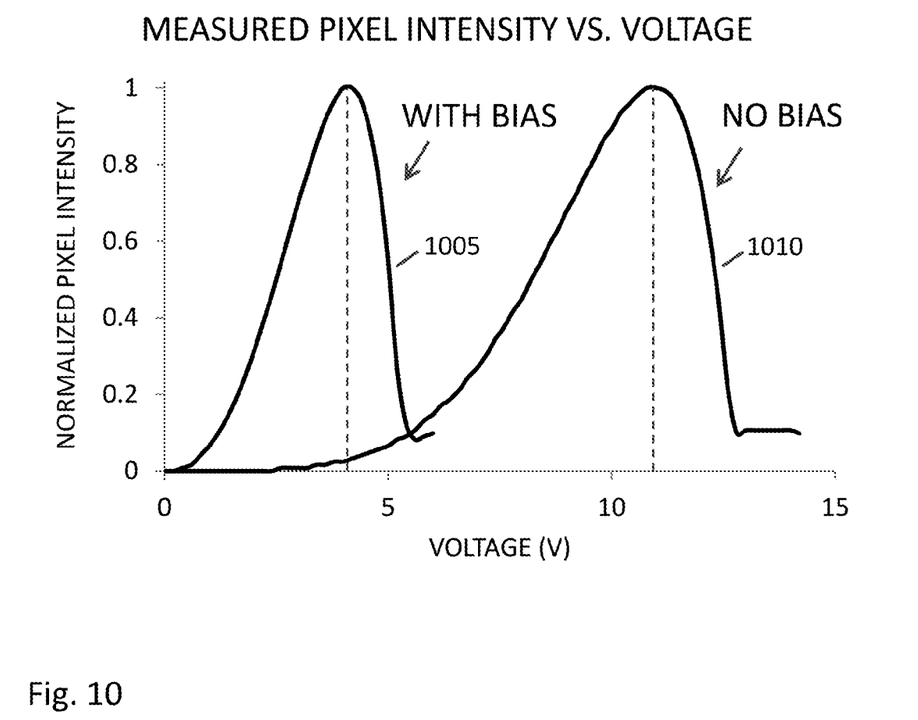
FIG. 10 is a graph of measured pixel intensity versus voltage for biased and unbiased MEMS-ribbon-array-based light modulators.
Figure 11:
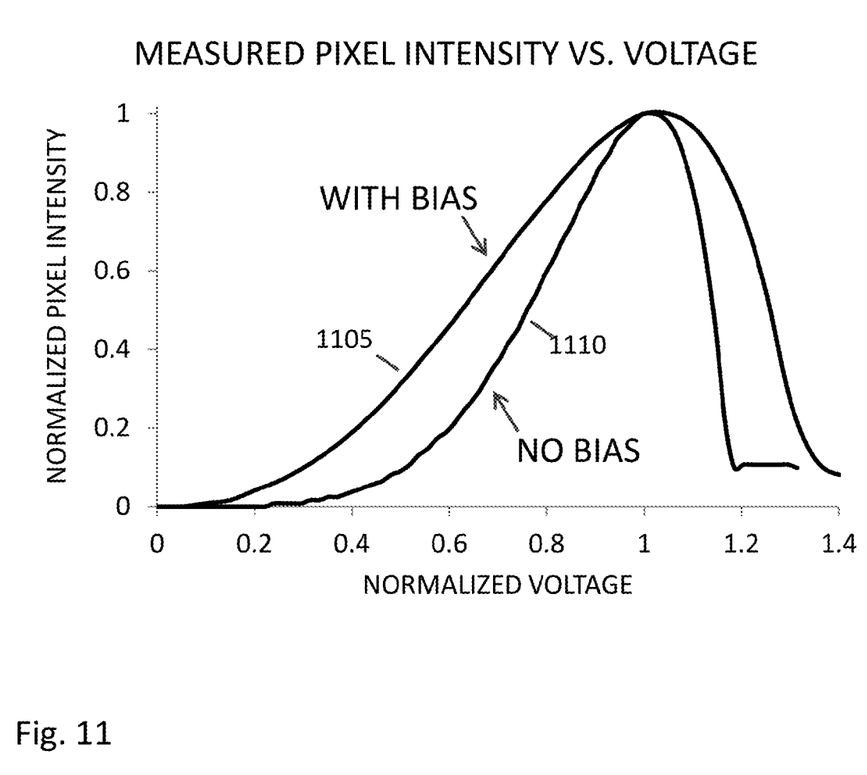
FIG. 11 is a graph of measured pixel intensity versus voltage for biased and unbiased MEMS-ribbon-array-based light modulators scaled such that the voltage required to obtain maximum pixel intensity is normalized to one in each case.

Experiments were performed with MEMS ribbon arrays to verify ribbon control with reduced signal voltages. The ribbons in the arrays were made of silicon nitride coated with aluminum and were approximately 250 μm long, 4 μm wide and 0.15 μm thick. They were separated from a conductive substrate by an approximately 0.45 μm air gap and an insulating silicon dioxide layer that was about 2.75 μm thick. (Each of these dimensions may vary by as much as plus or minus 50% without departing from the concept of a MEMS ribbon array.) FIGS. 10 and 11 illustrate results of the experiments.

FIG. 10 is a graph of measured pixel intensity versus voltage for biased and unbiased MEMS-ribbon-array-based light modulators. In FIG. 10 curve 1010 represents data for conventional ribbon drive with no bias voltage. Curve 1005 represents data for an array that is driven by a control signal that is in series with a 10 V bias voltage supply. It is apparent from the figure that the control signal voltage required to deflect a ribbon λ/4 beyond its biased position (about 4 V) is significantly less than the voltage required to deflect an unbiased ribbon by λ/4 (about 11 V).

FIG. 11 is a graph of measured pixel intensity versus voltage for biased and unbiased MEMS-ribbon-array-based light modulators scaled such that the voltage required to obtain maximum pixel intensity is normalized to one in each case. (This figure is analogous to FIG. 6) In FIG. 11 curves 1105 and 1110 represent the same data as curves 1005 and 1010 in FIG. 10. In FIG. 11, however, the voltage scale for each curve has been normalized such that a unit voltage produces maximum pixel intensity. It is apparent from the figure that a biased ribbon provides a more linear pixel intensity response than an unbiased ribbon. This reduces the need for a high resolution DAC to access brightness levels evenly from bright to dark.

As described above, ribbon nonlinear deflection characteristics may be used to reduce control signal voltages necessary to operate them. These techniques may be extended in several ways. For example, the best optical contrast is obtained from MEMS ribbon arrays that are operated in common mode; i.e. all ribbons are biased by the same bias voltage and alternate ("active") ribbons are controlled by signal voltages added in series with the bias. However, MEMS ribbon arrays do not have to be operated this way. For example, fixed ("static") ribbons may be fabricated such that their height above a substrate is different from active ribbons height even when all ribbons are in a relaxed, zero voltage state.

Second, control signal voltages added to a bias voltage need not be positive or even unipolar. Active ribbons may be biased to an intermediate brightness state and then deflected through their entire bright to dark range by an AC control signal voltage.

Finally, a transparent electrode may placed above a ribbon and connected electrically to the substrate. A bias voltage applied between the ribbon and the electrode-substrate then has the effect of increasing the ribbon's sensitivity to control signal voltages without deflecting it at all.

The common theme in all of these techniques is the use of a DC bias voltage to increase a MEMS ribbon's sensitivity to applied voltages and thus permit lower signal voltage operation.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A MEMS light modulator comprising:
    an array of MEMS ribbons suspended above a substrate;
    a bias voltage source; and,
    a signal voltage source;
    the bias voltage source, signal voltage source, and ribbons in the array being connected in series to create an overall potential difference between the ribbons and the substrate such that ribbons' deflection sensitivity to signal voltages is increased when the bias voltage is greater than zero.

2. The modulator of claim 1, the bias voltage source being connected to each ribbon in the array and the signal voltage source being connected in series with the bias voltage source to a subset of the ribbons in the array.

3. The modulator of claim 2, the subset being every second ribbon in the array.

4. The modulator of claim 1, the bias and signal voltage sources changing sign such that the direction of an electric field between ribbons and substrate alternates periodically.

5. The modulator of claim 1, the length, width and thickness of each ribbon in the array being approximately 250 µm, 4 µm and 0.15 µm, respectively, and the ribbons being made from silicon nitride and a reflective metal coating.

6. A method for driving a MEMS ribbon-based light modulator comprising:
    providing an array of MEMS ribbons suspended above a substrate, the array comprising active ribbons and static ribbons;
    applying a bias voltage between the each of the ribbons and the substrate to increase the ribbons deflection sensitivity to signal voltage;
    adding a signal voltage in series with the bias voltage for active ribbons in the array; and,
    controlling deflection of the active ribbons by varying the signal voltage applied to each one.

7. The method of claim 6, every second ribbon in the array being an active ribbon.

8. The method of claim 6 further comprising:
    alternating the direction of an electric field between ribbons and substrate by periodically changing the sign of the bias and signal voltages.

* * * * *